(12) United States Patent
Snyder

(10) Patent No.: US 11,425,076 B1
(45) Date of Patent: *Aug. 23, 2022

(54) METHOD AND SYSTEM FOR FILTERING ELECTRONIC COMMUNICATIONS

(71) Applicant: Mesh Labs Inc., Brooklyn, NY (US)

(72) Inventor: Asher Snyder, Brooklyn, NY (US)

(73) Assignee: Mesh Labs Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,827

(22) Filed: Oct. 12, 2020

Related U.S. Application Data

(63) Continuation of application No. 14/527,762, filed on Oct. 29, 2014, now Pat. No. 10,805,251.

(60) Provisional application No. 61/898,746, filed on Nov. 1, 2013, provisional application No. 61/897,422, filed on Oct. 30, 2013.

(51) Int. Cl.
*H04L 51/212* (2022.01)

(52) U.S. Cl.
CPC .................................. *H04L 51/212* (2022.05)

(58) Field of Classification Search
None
See application file for complete search history.

(56) References Cited

U.S. PATENT DOCUMENTS

| | | | | |
|---|---|---|---|---|
| 6,546,416 B1 * | 4/2003 | Kirsch | .................. | G06Q 10/107 709/219 |
| 6,665,389 B1 * | 12/2003 | Haste, III | ............... | G06Q 10/10 370/259 |
| 7,668,951 B2 * | 2/2010 | Lund | ..................... | H04L 67/327 709/223 |
| 7,937,480 B2 * | 5/2011 | Alperovitch | ........ | H04L 63/1425 709/229 |
| 8,214,497 B2 * | 7/2012 | Alperovitch | ........ | H04L 63/0227 709/226 |
| 8,990,312 B2 * | 3/2015 | Wilson | .................. | H04L 51/212 709/206 |
| 9,177,293 B1 * | 11/2015 | Gagnon | ................ | H04L 51/212 |
| 2003/0093518 A1 * | 5/2003 | Hiraga | .................. | H04L 63/104 709/224 |
| 2003/0110400 A1 * | 6/2003 | Cartmell | ............. | H04L 63/0254 726/4 |
| 2004/0073617 A1 * | 4/2004 | Milliken | ............... | G06F 21/562 709/224 |
| 2004/0153305 A1 * | 8/2004 | Enescu | ................. | G06F 40/117 704/2 |
| 2004/0207878 A1 * | 10/2004 | Ferlitsch | ............ | H04N 1/00848 358/2.1 |

(Continued)

*Primary Examiner* — Javier O Guzman
(74) *Attorney, Agent, or Firm* — Michael P. Kochka, Esq.

(57) ABSTRACT

The present invention discloses a method and system for filtering electronic communications based on the receiver's tolerance for attributes of both a sender and an electronic communication. The receiver's tolerance for an attribute is calculated based on a variety of factors including, but not limited to: self-reported preferences, past behavior and community norms. The attribute score is calculated based on an analysis of how closely either the sender or electronic communication exemplifies the attribute. An electronic communication is filtered if the attribute score exceeds the receiver's tolerance of the attribute. If an electronic communication is filtered it will not show up in the receiver's in-box, it will instead show up in a spam folder.

11 Claims, 8 Drawing Sheets

(56) References Cited

U.S. PATENT DOCUMENTS

| | | | |
|---|---|---|---|
| 2005/0039057 A1* | 2/2005 | Bagga | G06F 21/46 726/19 |
| 2005/0044154 A1* | 2/2005 | Kaminski | H04L 51/212 709/206 |
| 2005/0125544 A1* | 6/2005 | Zhao | H04L 51/04 709/227 |
| 2005/0188090 A1* | 8/2005 | Washburn | H04L 51/38 709/226 |
| 2006/0004896 A1* | 1/2006 | Nelson | G06Q 10/107 |
| 2006/0015563 A1* | 1/2006 | Judge | G06Q 10/107 709/206 |
| 2006/0129644 A1* | 6/2006 | Owen | H04L 51/12 709/206 |
| 2006/0168006 A1* | 7/2006 | Shannon | H04L 51/12 709/206 |
| 2006/0224750 A1* | 10/2006 | Davies | H04W 4/12 709/229 |
| 2006/0271629 A1* | 11/2006 | MacDowell | G06Q 10/107 709/229 |
| 2007/0031800 A1* | 2/2007 | Solomon | G06Q 30/02 434/322 |
| 2007/0061402 A1* | 3/2007 | Mehr | H04L 51/12 709/206 |
| 2007/0282770 A1* | 12/2007 | Choi | G06N 20/00 706/20 |
| 2008/0104188 A1* | 5/2008 | Oliver | H04L 51/212 709/206 |
| 2010/0011436 A1* | 1/2010 | Rolls | H04L 63/08 726/15 |
| 2010/0049809 A1* | 2/2010 | Ladd | G06Q 10/107 709/206 |
| 2010/0077032 A1* | 3/2010 | Drennan | G06Q 30/02 709/206 |
| 2010/0223581 A1* | 9/2010 | Manolescu | G06Q 10/00 715/853 |
| 2010/0229223 A1* | 9/2010 | Shepard | H04L 67/02 726/5 |
| 2011/0113113 A1* | 5/2011 | Ryan | H04L 51/20 709/206 |
| 2011/0252043 A1* | 10/2011 | Webb-Johnson | H04L 51/212 707/748 |
| 2012/0066763 A1* | 3/2012 | McHugh | H04L 63/20 726/22 |
| 2012/0254333 A1* | 10/2012 | Chandramouli | G06N 5/04 709/206 |
| 2013/0254787 A1* | 9/2013 | Cox | H04N 21/4661 725/13 |
| 2014/0020047 A1* | 1/2014 | Liebmann | H04L 63/20 726/1 |
| 2014/0222926 A1* | 8/2014 | Allen | H04L 67/22 709/204 |
| 2014/0273987 A1* | 9/2014 | Price | H04L 51/12 455/414.1 |
| 2014/0289259 A1* | 9/2014 | Tamma | G06F 16/335 707/748 |
| 2014/0372290 A1* | 12/2014 | Khaef | H04L 65/403 705/39 |
| 2015/0120848 A1* | 4/2015 | Snyder | H04L 51/12 709/206 |

* cited by examiner

US 11,425,076 B1

METHOD AND SYSTEM FOR FILTERING ELECTRONIC COMMUNICATIONS

CROSS-REFERENCES TO RELATED APPLICATIONS

The present application claims the benefit of priority of U.S. Provisional Patent Application No. 61/897,422 filed on Oct. 31, 2013 and U.S. Provisional Patent Application No. 61/898,746 filed on Nov. 1, 2013, the entire disclosures of which are hereby incorporated herein by reference.

BACKGROUND OF THE INVENTION

The present invention relates to information processing systems. More specifically the invention is related to the field of filtering unwanted electronic communications.

On any given day internet users' are sent an overwhelming amount of unwanted electronic communications, or "spam". Not surprisingly spam is considered to be an annoyance to internet users and many methods have been disclosed to identify spam and prevent it from reaching the receiver's in-box. There are three basic approaches used for filtering: Content Based Analysis (CBA); Sender Identification (SI); and Sender Reputation Analysis (SRA).

CBF processes the information contained within the electronic communication such as: the message body; attachments; hyperlinks; and images for the purpose of identifying the electronic communication as spam or legitimate according to objective predetermined criteria. SI processes electronic communications to determine the sender's identity for the purpose of comparing the sender's identity to a list of known spammers, "blacklisting", or known legitimate users, "whitelisting", and identifying the electronic communication as spam or legitimate accordingly. SRA processes at least one electronic communication from a sender for the purpose of identifying the sender as a spammer or legitimate user based on objective predetermined criteria. These approaches are not mutually exclusive and can be used in consort. They efficiently identify objective spam, such as: mass solicitations; chain letters; and links to download computer viruses.

The disclosed approaches fail to identify spam in many contexts. For example, many online dating services (ODS) have been developed to provide an online meeting place for people seeking to meet new friends or potential life partners based, in part, on their compatibilities. Once an individual registers with the ODS as a member they have access to a database containing profiles of other members. These profiles contain personal information about the member for example: likes and dislikes; beliefs; age; and job. Members are free to send electronic communications supported by the ODS to other members.

Spam is a significant problem for ODS members. They receive a significant number of abusive or otherwise disturbing electronic communications on a daily basis. Along with these communications they receive a significant amount of electronic communications from well-intentioned members who, through no fault of own, do not meet the subjective requirements preferences of the recipient. They may for example: be too old, have the wrong hair color, or just not interest the recipient. Significantly, these factors cannot be captured by the traditional spam mitigation approaches in spam identification. CBA cannot identify the electronic communication as spam as there is no spammy content in the electronic communication. Blacklisting and whitelisting and SBA fail for similar reasons, the sender of the communication is not a "spammer" it is the subjective preferences of the recipient that cause the electronic communication to be spam. There is no reason to stop all of the electronic communications from this sender as they are not considered spam by all users.

For this reason many ODS members end up leaving the dating service, since they have to wade through so many unwanted communications to fine one potential match. There is therefore a need for an approach that is capable of: identifying the subjective preferences of the receiver and determine whether to filter the electronic communication based at least in part on the subjective preferences of the receiver.

BRIEF DESCRIPTION OF THE INVENTION

A preferred embodiment of the present invention discloses a spam filtering method comprising: analyzing compatibility of a sender and a receiver of an electronic communication to calculate a compatibility score, the compatibility score is a numerical value, wherein a lower value is indicative of less compatibility and a higher numerical value is indicative of greater compatibility; and determining whether to filter the electronic communication based, at least in part, on the compatibility score.

A second preferred embodiment of the present invention discloses a spam filtering method comprising: receiving an electronic communication from a sender; preventing the sender from sending an additional electronic communication until a compatibility score is calculated; and calculating a compatibility score.

A third preferred embodiment of the present invention discloses a spam filtering system comprising: a compatibility component configured to analyze compatibility of a sender and a receiver of an electronic communication to calculate a compatibility score: the compatibility score is a numerical value, wherein a lower value is indicative of less compatibility and a higher numerical value is indicative of greater compatibility; and a filtering component configured to determine whether to filter the electronic communication based, at least in part, on the compatibility score.

BRIEF DESCRIPTION OF THE DRAWING(S)

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Certain terminology is used in the following description for convenience only and is not limiting. Unless specifically set forth herein, the terms "a", "an", and "the" are not limited to one element but instead should be read as meaning "at least one". The terminology includes the words above specifically mentioned, derivatives thereof, and words of similar import.

Figure 1:
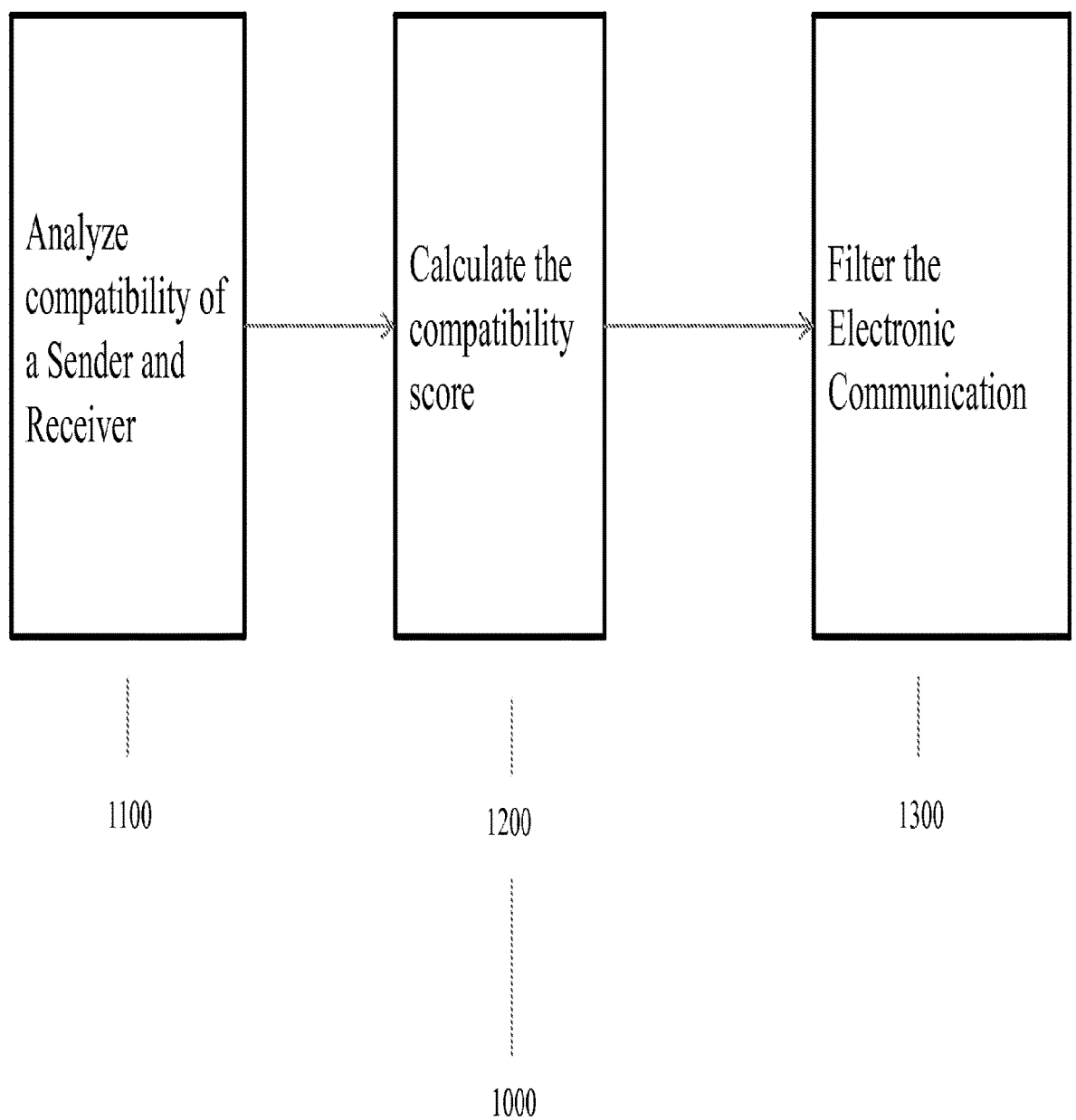
FIG. 1 is a high level schematic view of one of the preferred embodiments of the present invention.

As best shown in FIG. 1 a preferred embodiment the present invention discloses a method for filtering spam 1000. The method comprises the steps of: analyzing the compatibility of a sender and a receiver of an electronic communication 1100; calculating a compatibility score based, at least in part on the analysis of the compatibility of the sender and the receiver 1200; and determining whether to filter the electronic communication based, at least in part on the compatibility score 1300.

Figure 2:
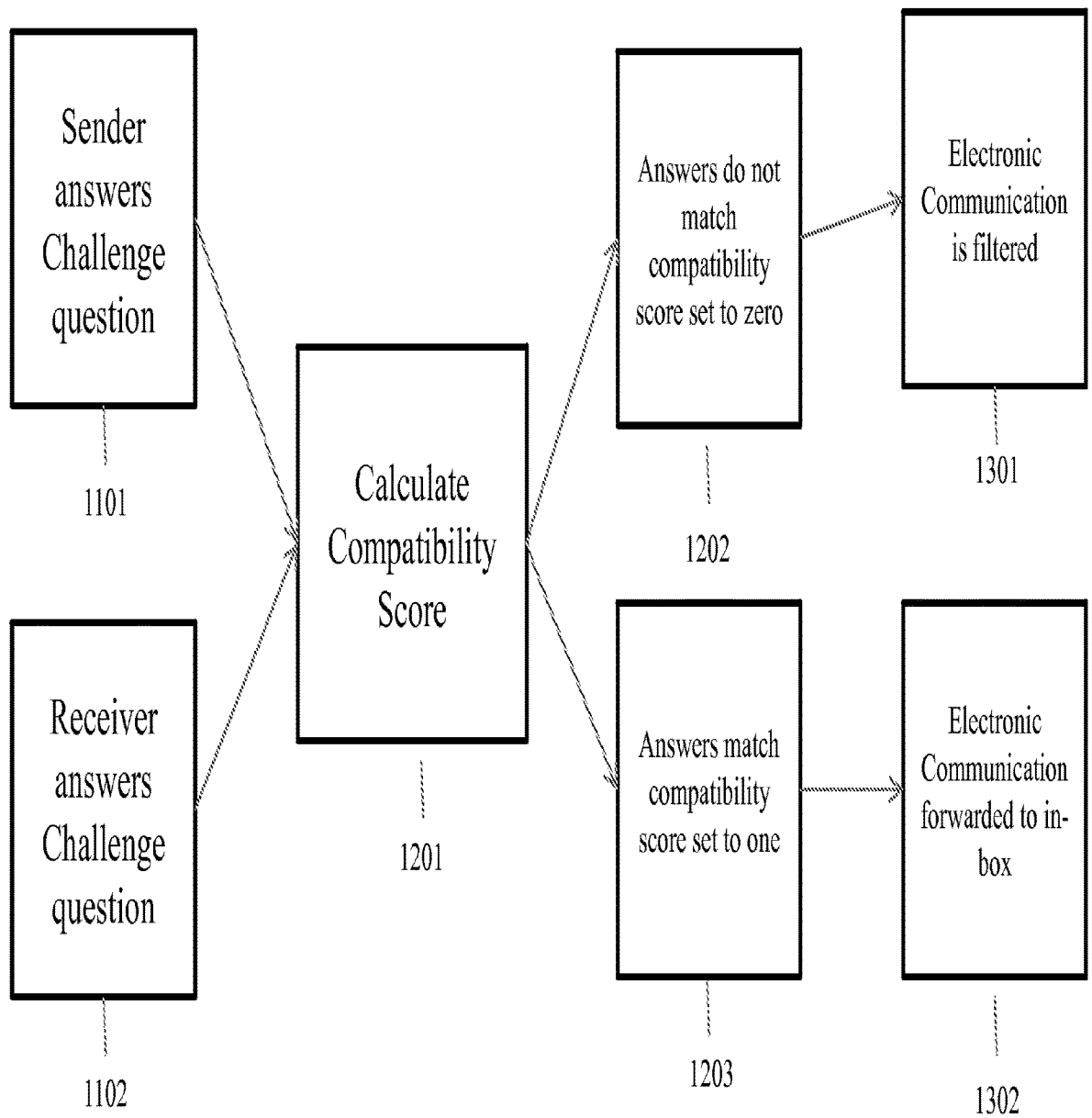
FIG. 2 is a schematic view showing a method for calculating a compatibility score and determining how to filter an electronic communication.

As best shown in FIG. 2. The step of analyzing the compatibility of the sender and receiver can be accomplished by requesting both the sender and the receiver to provide an answer to a challenge question 1101 and 1102. For example for an ODS challenge question may be "do you smoke", with potential answers of: often; sometimes; occasionally; or never. The answer of the sender and the receiver are then compared 1201.

Preferably the sender and the receiver will be requested a plurality of challenge questions. Even more preferably the sender and receiver will be requested to answer 5 challenge questions. Preferably the challenge question is selected by the receiver for the sender to answer from a plurality of potential challenge question. Preferably the challenge question is a multiple choice question wherein the sender and the receiver are required to provide exactly one answer. Optionally any question where an analysis of the responses would lead to an increased or decreased likelihood of compatibility may be utilized. Such questions are known in the art and no detailed description is required.

The compatibility score is a numerical value that captures the anticipated response a receiver will have to receiving an electronic communication from the sender. A higher value indicates a greater compatibility between the sender and receiver and consequently a diminished chance of the receiver considering the electronic communication spam. A lower value is indicia of a lower compatibility between the sender and receiver and consequently a greater change that the receiver will consider the electronic communication to be spam. If the sender's response to the challenge question 1101 does not match the receiver's response to the challenge question 1102 then then this would indicate that the sender and receiver are not compatible and the compatibility score is set to zero 1202. If the sender's response to the challenge question 1101 does match the receiver's response to the challenge question 1102 then then this would indicate that the sender and receiver are compatible and the compatibility score is set to one 1203. Optionally a range of values between zero and one can be used to represent a continuum of compatibility.

The electronic communication will then be filtered based, at least in part on the compatibility score. If the compatibility score is zero 1202 then the electronic communication will be filtered 1301. If the compatibility score is one 1203 then the electronic communication will be forwarded to the receiver's in-box 1302. Filtering, FIG. 1 1300, is the process of preventing the electronic communication from being forwarded to the receiver's in-box. Preferably the filtered electronic communication is still forwarded to the receiver however; it is forwarded to a spam folder. This advantageously allows the receiver to overrule the filtering if they feel they are compatible with the sender. Alternatively the filtered electronic communication can be completely blocked and not forwarded to the receiver.

Figure 3:
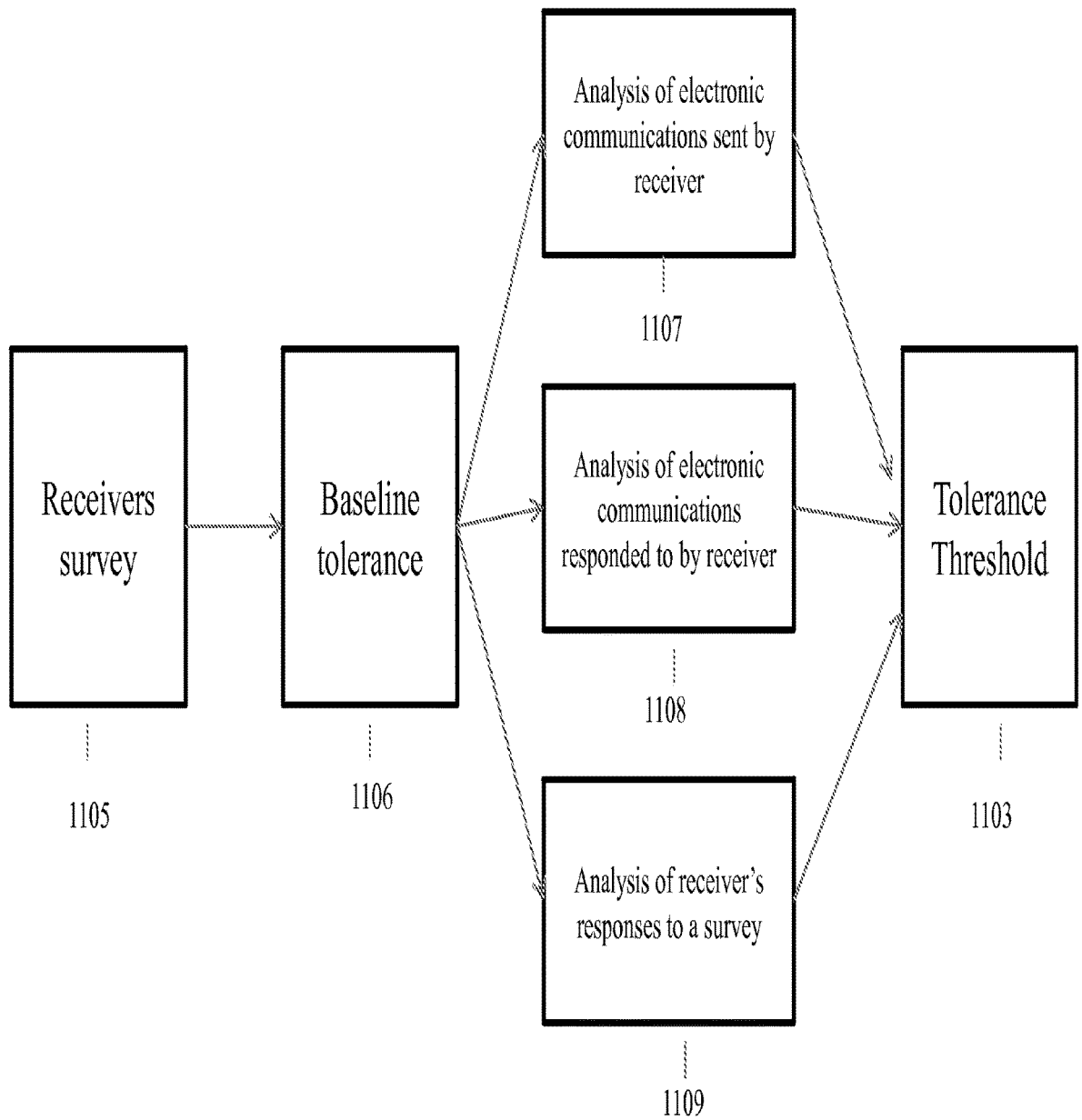
FIG. 3 is a schematic view showing a method for calculating a tolerance threshold.
Figure 4:
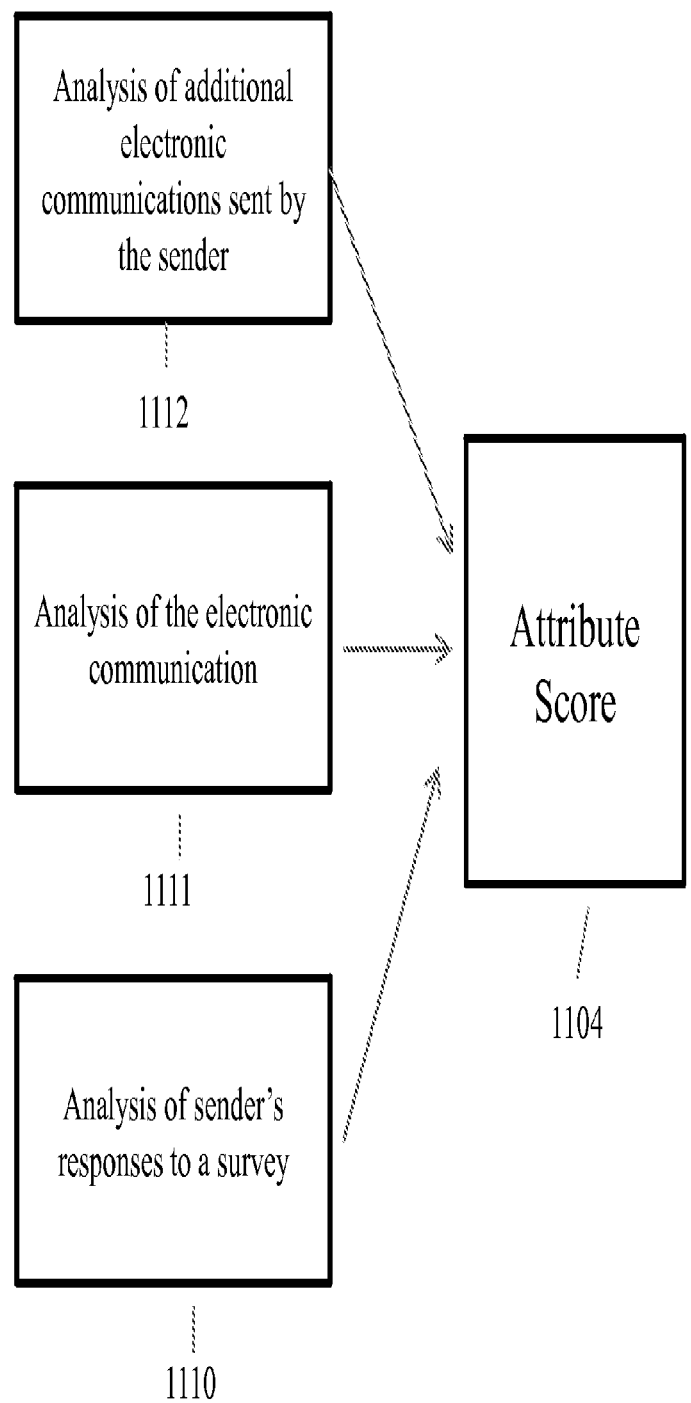
FIG. 4 is a schematic view showing a method for calculating an attribute score.

Alternatively, as best shown in FIGS. 3-4, analyzing the compatibility of the sender and the receiver can be accomplished by calculating a tolerance threshold 1103 and an attribute score 1104. The tolerance threshold 1103 is a numerical value representing the receiver's tolerance of an attribute. The attribute may be associated with: the sender for example in the ODS context, an attribute may be does the sender smoke; or the electronic communication for example, does the electronic communication contain cut and pasted sections. A high value represents a greater tolerance for the attribute while a lower value represents a lower tolerance for the attribute.

Preferably a baseline tolerance 1106 is initially to the tolerance threshold of a plurality of receivers. The tolerance threshold of the plurality of receivers is determined by a survey 1105. Survey methods are known in the art and a detailed description of the survey is not needed. The baseline tolerance 1106 is then adjusted up to indicate a greater tolerance for the attribute or down to indicate a lower tolerance for the attribute. The adjustments are calculated based upon an analysis of: zero or more electronic communications sent by the receiver 1107; zero or more electronic communications responded to by the receiver 1108; and the responses the receiver gave to the survey 1109.

As shown in FIG. 4, the attribute score 1104 is a numerical value that represents how well the sender or the electronic communication exemplifies a particular attribute. A higher attribute score 1104 indicates that the sender or the electronic communication exemplifies the attribute; a lower score indicates that the sender or electronic communication do not exemplify the attribute. The attribute score 1104 is calculated by analyzing: the sender's response to the survey 1110; the electronic communication 1111; and zero or more additional electronic communications sent by the sender 1112.

Figure 5:
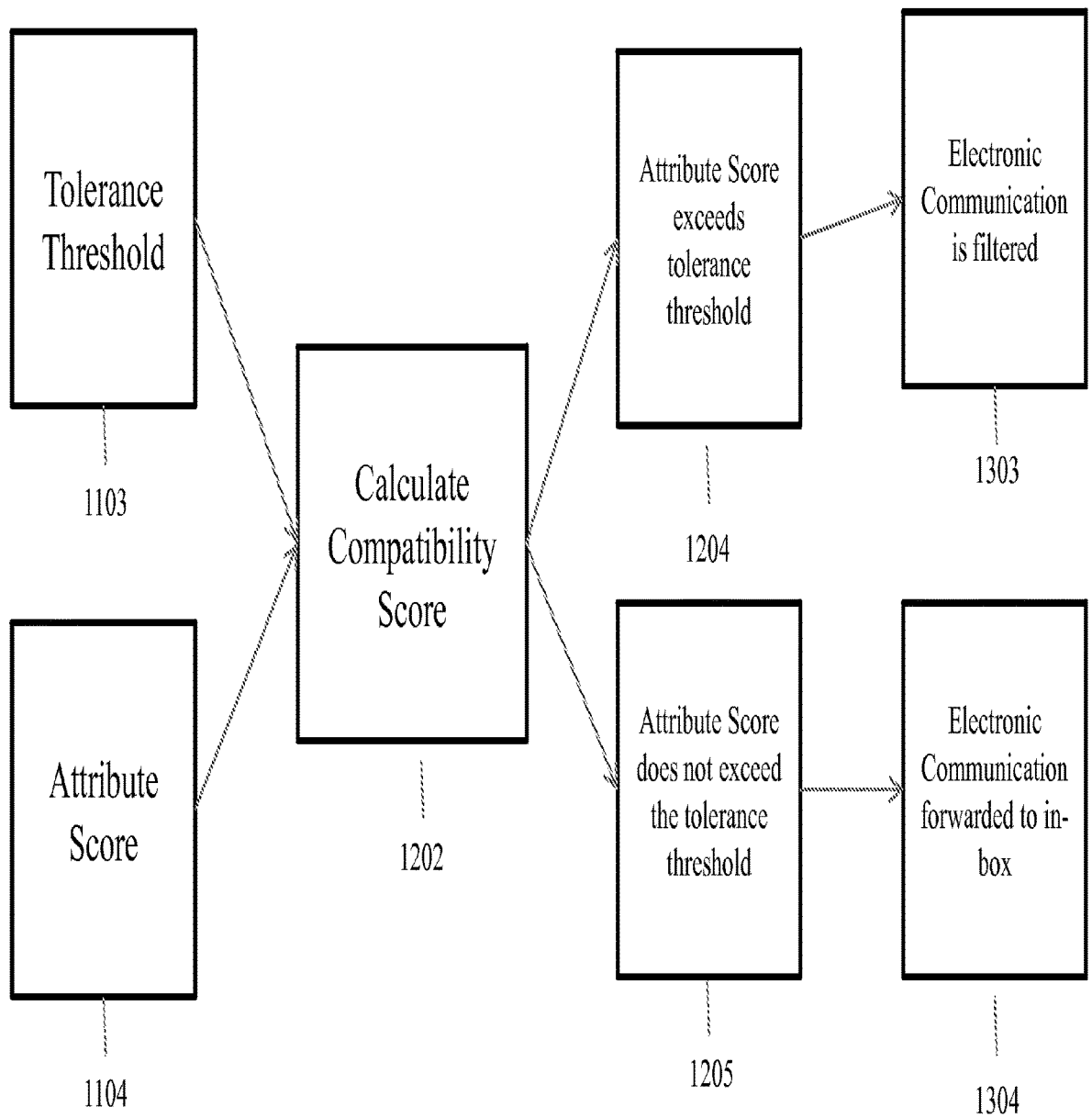
FIG. 5 is a schematic view showing an alternate method for calculating a compatibility score and determining how to filter an electronic communication.

As shown in FIG. 5 the tolerance threshold 1103 and attribute score 1104 are utilized to calculate a compatibility score 1202. The compatibility score is a numerical value that attempts to quantify if the receiver will tolerate the sender's attributes. Preferably If the Attribute score exceeds the tolerance threshold 1204 this indicates that the receiver will not be able to tolerate the sender's attributes and the compatibility score will be set to zero. Alternatively, if the Attribute score does not exceeds the tolerance threshold 1205 this indicates that the receiver will be able to tolerate the sender's attributes and the compatibility score will be set to one. Optionally the compatibility score may take on any value between zero and one to indicate a range of compatibility.

When the attribute score exceeds the tolerance threshold 1204 the sender and the receiver are not compatible and the electronic communication is filtered 1303. If the attribute score does not exceed the tolerance threshold 1205 then the sender and the receiver are compatible and the electronic communication is forwarded to the receiver's in-box 1304.

Figure 6:
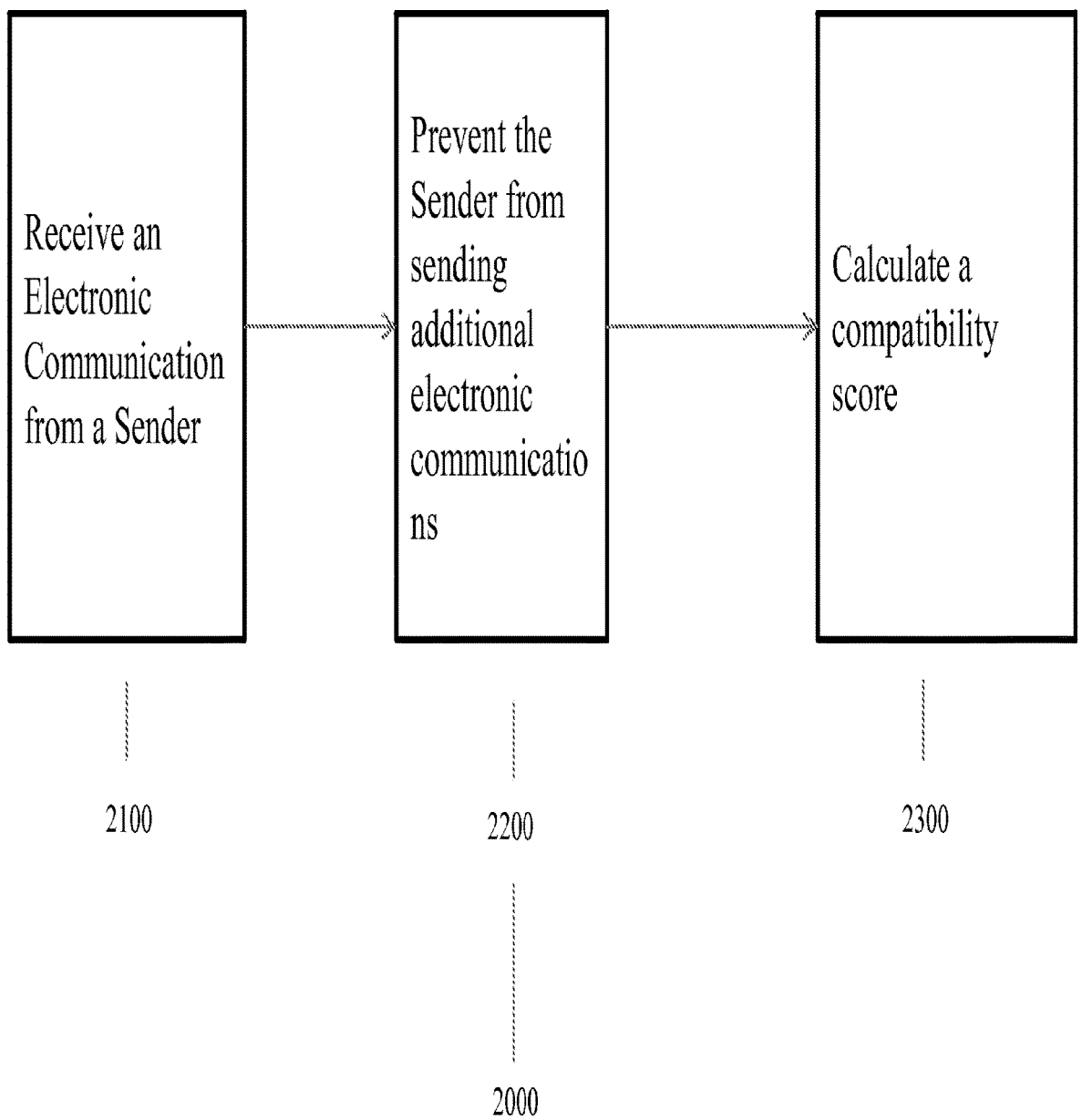
FIG. 6 is a high level schematic view of one of a second preferred embodiment of the present invention.
Figure 7:
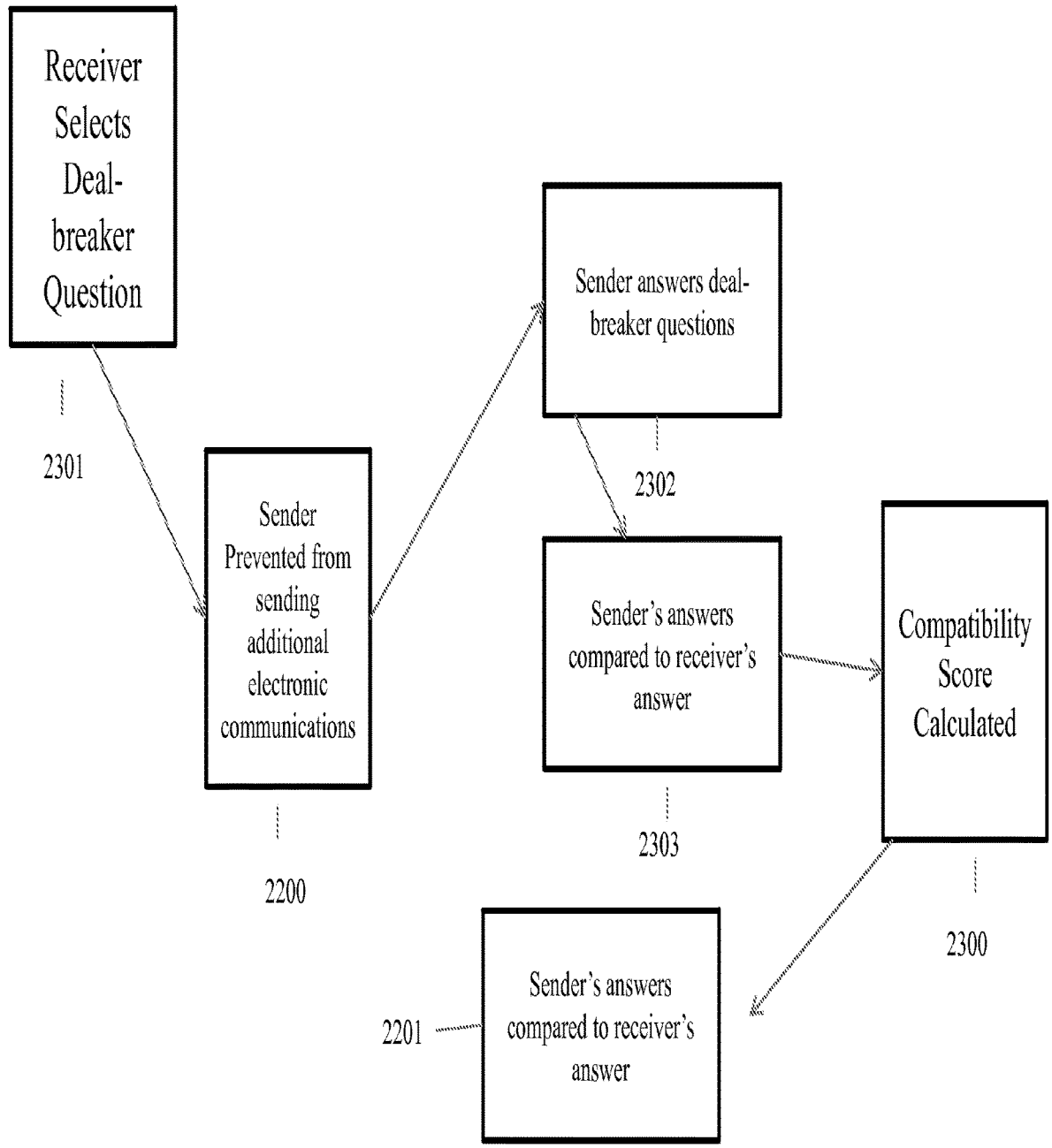
FIG. 7 is a more detailed schematic view of one of a second preferred embodiment of the present invention.

In a second preferred embodiment as best shown in FIG. 6 the present invention discloses a method for filtering spam 2000 comprising the steps of: receiving an electronic communication 2100; preventing a sender who is the sender associated with sending the electronic communication from sending one or more additional electronic communications until a compatibility score is determined 2200; and calculate a compatibility score 2300. As shown in FIG. 7 the receiver selects a deal-breaker question 2301. Preferably the receiver will select the deal-breaker question from a plurality of potential deal-breaker questions 2301. The receiver may select any number of deal-breaker questions. Preferably the receiver will select five deal-breaker questions. The sender will be prevented from sending an additional electronic communication, FIG. 6. 2200, until the sender answers all deal breaker questions selected by the receiver 2301. As shown in FIG. 7 once the sender answers all the deal-breaker questions; the sender's answers are compared to the receiver's responses 2303. A compatibility score is calculated based on this comparison 2300. Once the compatibility score has been calculated 2300 the Sender may send additional electronic communications 2201. This advantageously incentives the sender to respond to the deal-breaker questions quickly. All calculations performed by this and the previous embodiment are done by means of a computer processor.

Figure 8:
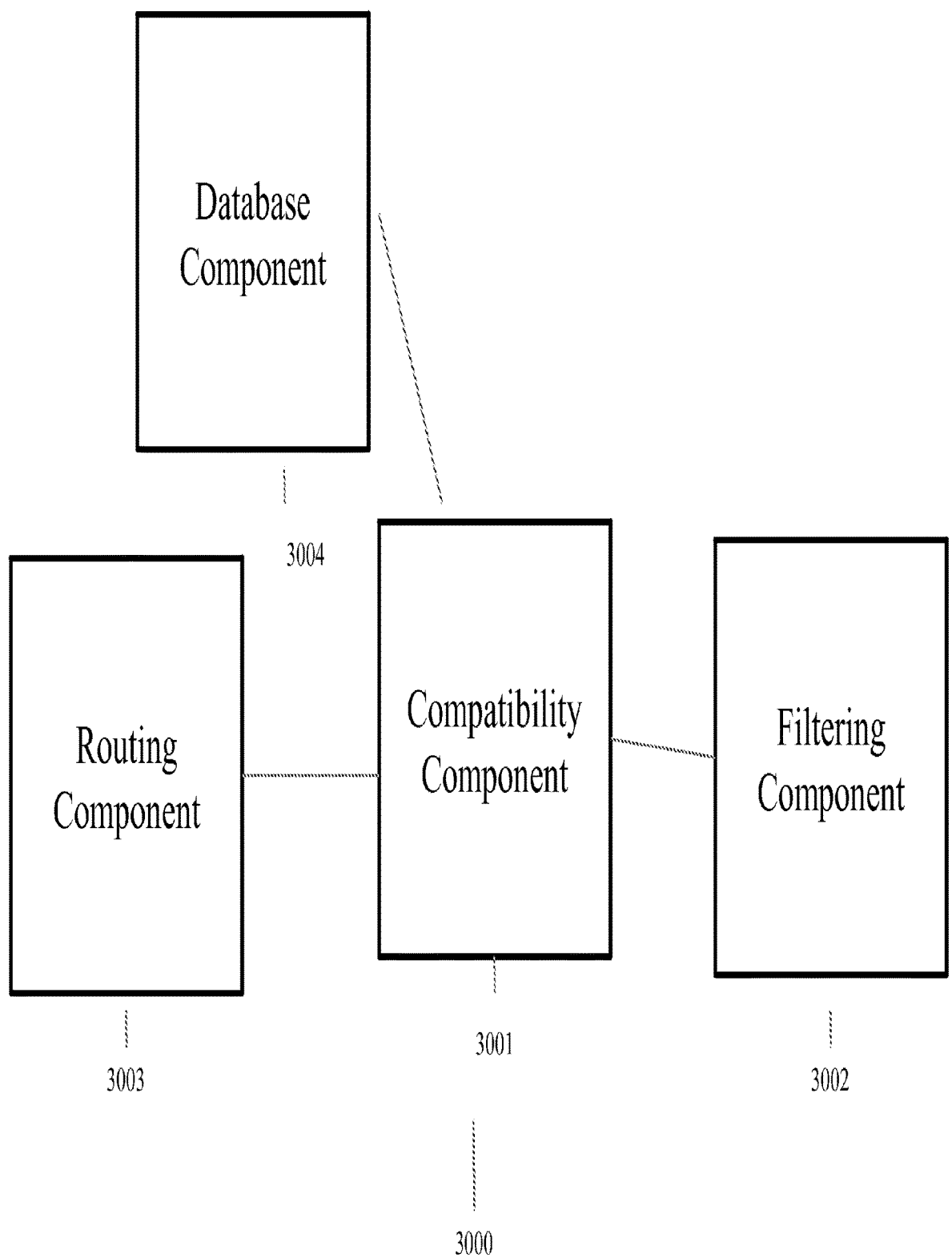
FIG. 8 is a high level schematic view of a third preferred embodiment of the invention.

In a third preferred embodiment the invention discloses a spam filtering system as shown in FIG. 8, 3000 comprising: a compatibility component 3001 configured to; analyze the compatibility of a sender and receiver of an electronic communication to calculate a compatibility score; and a filtering component 1301 configured to determine whether to filter an electronic communication based, at least in part on the compatibility score. The compatibility score is a numerical representation of the compatibility between the sender and the receiver. A higher compatibility score indicates a greater compatibility and a lower compatibility score indicates a lower compatibility. The spam filtering system further comprising a routing component 3003, wherein the routing component retrieves the electronic communication from the sender and forwards the electronic communication to the receiver. The spam filtering system further comprising a database component 3304, configured to store a plurality of profiles in a computer readable format. Each profile is associated with one of a plurality of receivers or one of a plurality of senders. The compatibility component 3001 is further configured to analyze a profile of a sender to calculate an attribute score. The compatibility component 3001 is further configured to analyze a profile of a receiver to calculate a tolerance threshold. The filtering component 3002 is configured to compare the tolerance threshold to the attribute score to determine a compatibility score.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A spam filtering method comprising:
    analyzing compatibility of a sender and a receiver of an electronic communication, the analyzing comprising:
        calculating a compatibility score based on a compatibility of the sender and the receiver;
        determining whether to filter the electronic communication based on the compatibility score;
        requesting the receiver provide a response to a plurality of challenge questions; and
        requesting a sender provide a response to the plurality of challenge questions;
        determining whether the response provided by the sender matches the response provided by the receiver; and
    blocking communications from the sender to the receiver unless the compatibility score is within a predetermined range;
    calculating an attribute score, wherein the tolerance threshold is a numerical value representing the receiver's tolerance of an attribute; and
    wherein the attribute score is calculated, at least in part, by analyzing:
        the sender's response to a survey requesting information on the attributes;
        the electronic communication sent by the sender; and
        zero or more other electronic communications sent by the sender.

2. The method of claim 1, wherein the compatibility score comprises a numerical value.

3. The method of claim 2, wherein a lower numerical value is indicative of less compatibility and a higher numerical value is indicative of greater compatibility and wherein a higher numerical value is indicative of a diminished chance of the receiver considering the electronic communication spam.

4. The method of claim 1, wherein determining whether to filter the electronic communication comprises filtering the electronic communication if the compatibility score is calculated to be zero.

5. The method of claim 1, wherein in analyzing the compatibility of the sender and the receiver comprises:
    calculating the tolerance threshold, wherein calculating the receiver's tolerance threshold comprises:
        setting a baseline tolerance threshold, wherein the baseline tolerance threshold is based, at least in part on a survey of a plurality receivers requesting information about an attribute, an attribute comprising one or more personal habits of the sender; and
        adjusting the baseline tolerance.

6. The method of claim 5, wherein adjusting the baseline tolerance is based, at least in part on analyzing:
    the receiver's past history, wherein the past history comprises:
        zero or more electronic communications sent by the receiver;
        zero or more electronic communications responded to by the receiver; and
        the receiver's responses to the survey.

7. The method of claim 1, wherein the attribute score is a numerical value representing how much the attribute is exemplified.

8. The method of claim 1, wherein the challenge question is a multiple-choice question.

9. The method of claim 1, wherein both the receiver and the sender are requested to provide exactly one response to the challenge question.

10. The method of claim 1, wherein calculating the compatibility score comprises setting the compatibility score zero if the attribute score is greater than the tolerance threshold.

11. The method of claim 1, further comprising:
receiving an indication of one or more deal-breaker questions from the receiver to be sent to the sender and a preferred answer to the one or more deal-breaker questions;
receiving an answer to the one or more deal-breaker questions from the sender;
determining whether the answer from the sender to the one or more deal-breaker questions matches one or more preferred answers to the one or more deal-breaker questions selected by the receiver;
preventing the sender from sending electronic communications to the receiver unless the answer from the sender to the one or more deal-breaker questions matches the one or more preferred answers to the one or more deal-breaker questions selected by the receiver; and
allowing the receiver to receive communications from the sender if the answer from the sender to the one or more deal-breaker questions matches the one or more preferred answers to the one or more deal-breaker questions selected by the receiver.

\* \* \* \* \*